UNITED STATES PATENT OFFICE.

GEORGE DEFREN, OF NEWTON, MASSACHUSETTS.

PROCESS OF PREPARING BEVERAGES.

1,214,518. Specification of Letters Patent. Patented Feb. 6, 1917.

No Drawing. Application filed June 29, 1914. Serial No. 847,972.

*To all whom it may concern:*

Be it known that I, GEORGE DEFREN, a citizen of the United States, and a resident of Newton, in the county of Middlesex and State of Massachusetts, have invented an Improvement in Processes of Preparing Beverages, of which the following description is a specification.

This invention relates to processes of preparing beverages, particularly as a substitute for malt beverages as heretofore produced.

To this end, the invention resides generally in the substitution of an acid-converted starch and protein product or a partially caramelized acid-converted starch and protein product, for a certain percentage, or, preferably, for the entire quantity, of malt or unmalted cereals, or other material, hitherto employed in brewing or distillery processes or in the production of any other beverage.

I am aware that acid-converted starch products, familiarly known as starch syrups or glucose, and so-called "grape" or starch sugars, are used in conjunction with malt, in the production of malt beverages, so-called, but such syrups or glucose and starch sugars are made generally from partially purified or refined starches, low in protein content. The commercial starch syrups or starch sugars are free from, or contain but a minute percentage of, soluble protein, such protein existing as an impurity, the carbohydrates present being the constituents advertised, sold and utilized as desired. It is the practice of starch syrup and starch sugar manufacturers to eliminate protein material as much as possible.

In my process, the presence of protein, soluble in slightly acid media, accompanying the formation of acid-converted starch products, is a desirable feature, as the foam-keeping capacity, full-bodied taste, viscosity and fermentability, as generally understood by those versed in the art of manufacturing malt or fermented liquids, are largely dependent thereon. Moreover, the presence of protein in an acid-converted starch product, when caramelized by heat, gives a better aromatic odor, flavor, taste and deeper coloring properties than when the protein is absent.

It is well known that beers, including lager beer, ale, porter and allied products, have different percentages of alcohol. This difference is due largely to the varying percentages of fermentable carbohydrates present. I have discovered that the lower the specific (optical) rotation of the mixed carbohydrates present in an acid-hydrolyzed starch product, the greater the percentage of fermentability thereof by brewers' or distillers' yeasts, and that a wide range of fermentability by such yeasts can be obtained by regulating the optical rotation of the acid-converted starch product. In other words, the greater the degree of conversion of the starch, the greater the fermentability by yeast. I have also discovered that the same relationship of optical rotation to fermentability applied to an acid-converted starch and protein-containing material. In employing my process, it is just as feasible to prepare a stock ale, porter or stout with a high percentage of alcohol, as it is to produce a mild running ale, lager beer or even "temperance beer," so-called, low in alcohol, using identically the same starch and protein-containing material, but simply varying the quantity of acid employed, length of time of heating, or the temperature at which it is heated, or by a combination of these factors. A like variation of product is unattainable by using malt alone. This is owing to the fact that the enzyms, or ferments, contained in malt do not hydrolyze starch, nor its derivatives, through as wide a range of degrees of optical rotation, nor is the activity of the enzyms, or ferments, contained in malt susceptible of such exact control as is the action of acids dissociated in water solution. In other words, in employing my process as herein described, it is entirely feasible to produce beverages analogous to beverages produced from malt, possessing color, taste and flavor, in which no enzyms, or ferments, arising from the vital activity of cells participate. I would except the enzyms, or ferments, arising from the vital activity of yeast cells, molds or bacteria, as the fermentable carbohydrates present in solution produced by my process require the fermenting action of yeasts, molds or bacteria, in the identical manner as in fermented beverages or liquors made in whole or in part from malt.

The acid-converted starch and protein product I employ can be prepared from any starch and protein-containing material, such as maize, wheat, barley, rye, oats, rice or any other cereal, or any product thereof, preferably with the husk and germ removed, or from tubers or roots, such as the potato, cassava, arrow root, or from sago starch, or from fruits, such as the starchy portion of the banana, or from any other starch and portein-containing material, of from any mixture thereof.

I have found that preliminary drying, torrefication or partial caramelization of the starch and protein-containing material to be employed is advantageous, the material acquiring aromatic odor, flavor and taste and possessing coloring properties.

In my process, in order to obtain the best results, I employ finely divided starch and protein-containing material, with or without previous drying, torrefication or partial caramelization, stir, or mix, it in any convenient manner with acidulated water, preferably at a temperature above 150° F. (65.5° C.), applying further heat and boiling if necessary, preferably until the material acquires a thin gelatinous consistency, familiarly known as "starch paste". I then transfer this by pumping, or otherwise, into a converter, so-called, and heat under steam pressure at any temperature, such for example as 152° C., for any length of time required until the desired degree of conversion is attained. If desired, the preliminary mixing with hot acidulated water, stirring and further heating may be carried on in the converter under atmospheric pressure, the converter being then closed and the contents subjected to steam pressure as indicated. If desired my process may be carried out advantageously in any efficient "continuous converter", so-called. I then check the further conversion of the starch and protein-containing material by rapidly lowering the temperature to 212° F. (100° C.) or even lower if desired, or partially neutralize the acid by well-known means, or by a combination of said methods. Some of the protein present in the starch-containing material will not be entirely proteolyzed by the acid, and a large percentage of such insoluble protein is removed by means of a centrifuge, by sedimentation, defecation, or by filtration by known methods, such as a filter press, or by any combination of said methods, or by any other means.

It is of great importance and essential that the acid be only partially neutralized. Complete neutralization would eliminate most of the protein in solution. One of the important requisites of my process is to retain as much as possible of the protein which has been rendered soluble in the dilute acid media. It is necessary to maintain a slight acidity in the finished acid converted starch and protein product corresponding to that of about one tenth to two tenths of one per cent. of lactic acid. With such a low acidity, further conversion is extremely slow, especially at lowered temperatures and is negligible.

It is desirable to reclaim as much as possible of any admixed, soluble, starch and protein-conversion product from the insoluble portion by washing with water, or otherwise, and adding it to the main supply of conversion product. This acid-converted starch and protein product from which the major portion of the insoluble material has been removed, I shall call the "finished acid-converted starch and protein product".

If beverages analogous to malt beverages, including lager beers, ales, porter, or like products, are desired, I boil the finished acid-converted starch and protein product with the desired quantity of hops and a sufficient quantity of coloring and flavoring material, generally an extract of caramelized malt, sugar or other substance, but preferably a portion of the finished acid-converted starch and protein product caramelized in the following manner: I take a portion, say ten per cent. or more, as desired, of the finished acid-converted starch and protein product, neutralize its acid content, if any, by well-known methods until a specimen withdrawn therefrom is neutral or slightly alkaline to litmus test paper, evaporate its water content in a vacuum pan or open vessel until its moisture has been reduced to less than five per cent. of the weight of the whole fluid undergoing caramelization. I then continue boiling the neutralized finished acid-converted starch and protein product, preferably in an open vessel, in any convenient manner, thus expelling more moisture. The fluid becomes more viscous, the temperature rises, and the product darkens, the action of heat being to caramelize the product as ordinarily understood. This caramelization can be extended as far as desired. I have found that heating at 248 to 302° F. (120 to 150° C.) for from one to two hours gives satisfactory results, as indicated by agreeable odor, flavor, taste and marked coloring properties.

I have found that the so-called "break," or coagulation, of some of the protein in boiling the finished acid-converted starch and protein product with hops and the desired caramelization product can be improved by the addition of a small percentage of alkali, or alkaline earth, carbonate, hydroxid, or other neutralizing agent.

I have found that the addition of a small percentage of a soluble salt of casein, such for example as sodium, potassium or ammonium caseinate, has a beneficial clarifying behavior on the boiled, hopped, finished, acid-converted starch and protein-containing product. The amount of the salt of casein would vary, depending on the amount of semi-soluble albuminous matter and other material in suspension. About one hundredth of one per cent. of the weight of the liquor would meet ordinary requirements. This action is due to the liberation and precipitation of casein, generally in large flocks, from its salt by the acid still remaining in the boiled, hopped, finished, acid-converted, starch and protein-containing product. The flocks of liberated and precipitated casein float about in the hot boiling medium and, on settling, clarify the liquid by carrying any finely suspended insoluble particles down with them.

The hopped, boiled, caramel colored and flavored, finished, acid-converted starch and protein-containing product is then strained from the hops and coagulated protein, cooled and fermented by yeasts in the usual manner, with or without the addition of ammonium phosphate, or other ammonium salts, or so-called "yeast-water," or other yeast nutrient.

My process is equally applicable to the production of lactic or acetic acid, vinegar, sakè, or any other material requiring the formation of a starch and protein conversion product, and fermenting same by yeasts, molds, bacteria, or analogous organisms.

I have found it feasible, if desired, to manufacture beverages by my process paler in color than those obtainable by using malt.

The "degree of conversion" of an acid-hydrolyzed starch and protein-containing product can be determined approximately by the well-known reactions of hydrolyzed starch products with iodin solutions, but more accurately by means of the angular rotations of the clarified solution of the finished acid-converted starch and protein-containing product in a polariscope under standard conditions.

Any acid, or acid salt, or any mixture or concentration thereof which dissociates into its or their hydrogen and other ions to a greater or less degree in water solutions, as at present understood, can be utilized in my process.

I have found that a percentage of the protein present in the starch and protein-containing material is proteolyzed and rendered soluble by the action of the acid and remains soluble in slightly acid media. I would exclude the action of such acids as tannic acid and its analogues, phosphotungstic-acid, and all other acids, which enter into combinations with the soluble protein, forming compounds which are more or less insoluble.

I have found that the presence of a percentage of protein in a starch-containing material to be employed in my process necessitates a higher temperature or a longer treatment at the same temperature, if an equal quantity of acid be used for a like weight of starch recognized as commercially pure to obtain an equal degree of conversion of its carbohydrate contents, as measured by its coloration with iodin solutions or by its angular rotation in a polariscope under standard conditions.

I have found that a percentage of oil (or fat) in the starch and protein-containing material retards the activity of the acid used in the process of conversion.

I have found that I obtain a greater percentage of extraction of the starch and protein-containing material by my herein described process than is possible by the action of enzyms or ferments on the same material as at present practised.

It will be appreciated that a wide range of procedure can be followed in my process. The quantity of acid, and the temperature, and the time required for the conversion can easily be regulated. Incidentally, the percentages of oil (or fat) and protein, and their chemical compositions have an effect in retarding the hydrolysis of the starch present, by the acid used and must be taken into consideration, as is indicated in the following examples:

1. 150 parts finely ground corn grits were heated with 1000 parts of hot acidulated water containing about eight one hundredths of one per cent. hydrochloric acid under a steam pressure of sixty pounds. At the end of thirty-five minutes, the conversion had proceeded to the stage where iodin solution no longer gave a pale rose red coloration with a sample of the conversion product, corresponding to that of many beers made by the use of malt and malt substitutes.

2. Using the same quantity of finely ground rice, the same amount and kind of acid and the same steam pressure required about forty minutes to reach the same degree of conversion as is indicated in Example 1.

3. Using the same quantity of finely ground wheat, the same amount and kind of acid, and the same steam pressure, required about forty-five minutes to reach the same degree of conversion as is indicated in Example 1.

4. Using the same quantity of kiln-dried, finely ground rolled oats (without husks) and the same amount and kind of acid, and the same steam pressure, required about fifty minutes to reach the same degree of conversion as is indicated in Example 1.

A less, or greater, quantity of hydrochloric acid, or any other kind of acid which is non-injurious to the human system and dissociates in its water solution, may be used, and the steam pressure and the time for conversion would have to be regulated according to the requirements. Less acid or lower steam pressure would require a longer time for conversion, while more acid or a higher steam pressure would require a shorter time for conversion. Moreover stock ales, porters, etc., where a higher percentage of alcohol after fermentation is desired, would require a longer time for conversion than is the case with lager beers, mild running ales, or temperance beers, so called. This end point of desired conversion is best determined by polarimetry.

I have used hydrochloric acid in the above conversions, as hydrochloric acid is a normal constituent of stomach juices. Lactic acid, the normal acid of malt, could likewise be used, but more acid, higher conversion temperature or longer time of heating, or a combination of these factors, would be necessary, as the dissociation constant of lactic acid is considerably less than that of hydrochloric acid.

Having thus described the best mode known to me for carrying out my invention, I desire it to be understood that although specific terms are employed, they are used in a generic and descriptive sense and not for purposes of limitation, the scope of the invention being set forth in the following claims.

Claims:

1. The process of preparing alcoholic beverages of the character of beer or ale comprising the following steps: mixing with acidulated water a sufficient quantity of material containing starch and protein to supply in full the desired constituents of the product, heating the same to produce fermentable sugars in quantity equivalent to that obtained for the desired beverage by ordinary malt conversion, checking conversion of the material, leaving the product somewhat acid whereby to hold protein in solution, separating the liquid portion, boiling the same with hops and fermenting with yeast, some acidity persisting in the beverage.

2. The process of preparing alcoholic beverages of the character of beer or ale comprising the following steps: mixing with acidulated water a sufficient quantity of material containing starch and protein to supply in full the desired constituents of the product, heating the same to produce fermentable sugars in quantity equivalent to that obtained for the desired beverage by ordinary malt conversion, checking conversion of the material, leaving the product somewhat acid whereby to hold protein in solution, separating the liquid portion, caramelizing a part thereof and returning the same to the bulk, boiling the product with hops and fermenting with yeast.

3. The process of preparing alcoholic beverages of the character of beer or ale comprising the following steps: mixing with acidulated water a sufficient quantity of material containing starch and protein to supply in full the desired constituents of the product, heating the same to produce fermentable sugars in quantity equivalent to that obtained for the desired beverage by ordinary malt conversion, checking conversion of the material, leaving the product somewhat acid whereby to hold protein in solution, separating the liquid portion, boiling the same with hops, fining with alkaline casein and causing fermentation of the fined product.

In testimony whereof, I have signed my name to this specification, in the presence of two subscribing witnesses.

GEORGE DEFREN.

Witnesses:
EVERETT S. EMERY,
F. IRENE CHANDLER.